(12) United States Patent
Chen et al.

(10) Patent No.: US 8,949,229 B1
(45) Date of Patent: Feb. 3, 2015

(54) MEASURING VIDEO CONTENT OF WEB DOMAINS

(71) Applicant: Google Inc., Mountain View, CA (US)

(72) Inventors: Zhihui Chen, Menlo Park, CA (US); Varun Kacholia, Sunnyvale, CA (US); Hao Zhang, Shanghai (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/850,019

(22) Filed: Mar. 25, 2013

Related U.S. Application Data

(63) Continuation of application No. 13/106,467, filed on May 12, 2011, now Pat. No. 8,407,207.

(51) Int. Cl.
*G06F 17/30* (2006.01)
(52) U.S. Cl.
CPC .................................. *G06F 17/3053* (2013.01)
USPC ........... 707/723; 707/736; 707/758; 707/791; 707/802; 707/828

(58) Field of Classification Search
CPC ...................................................... G06F 17/30
USPC .................................................. 707/600–899
See application file for complete search history.

(56) References Cited

U.S. PATENT DOCUMENTS

2007/0103551 A1* 5/2007 Kim et al. ..................... 348/180

* cited by examiner

*Primary Examiner* — Isaac M Woo
(74) *Attorney, Agent, or Firm* — Fish & Richardson P.C.

(57) ABSTRACT

Methods, systems, and apparatus, including computer programs encoded on a computer storage medium, for determining a video score for a domain. In one aspect, a method includes determining video resources hosted on devices assigned to a domain, determining a quality metric for the video resources, generating a quality score from the quality metrics for video resources hosted on the domain, generating a quantity score based on counts of video resources hosted on the domain, determining a domain video score from the quality score and the quantity score, and adjusting, based on the domain video score, one or more video search operations on the video resources hosted on the domain.

20 Claims, 5 Drawing Sheets

FIG. 6

MEASURING VIDEO CONTENT OF WEB DOMAINS

CROSS-REFERENCE TO RELATED APPLICATION

This application is a continuation of U.S. patent application Ser. No. 13/106,467 entitled "Measuring Video Content of Web Domains" filed May 12, 2011, the disclosure of which is incorporated herein by reference in its entirety.

BACKGROUND

This specification relates to digital information processing, and particularly to processing video data.

The Internet provides access to a wide variety of resources, for example, video files, image files, audio files, or Web pages including content for particular subjects, book articles, or news articles. The resources are generally hosted on servers or server systems, which are computers that provide access to video and other resources over the Internet. The resources are accessed through uniform resource identifiers (URIs) such as uniform resource locators (URLs).

A search system crawls the Internet and indexes the resources in an index for use in searching. The search system scores resources based on their relevance to a search query and on their importance relative to other resources. The search system provides search results that link to the resources, and the search results are typically ordered according to the scores.

The search system can also use search queries for video-related searches to identify video resources that are relevant to the queries. Some search systems include an index specific to video resources to facilitate video related searches. However, for a video resource crawl, a much larger amount of processing resources are required than are required for a general crawl of web documents.

SUMMARY

In general, one innovative aspect of the subject matter described in this specification can be embodied in methods that include the actions of determining video resources hosted on devices assigned to a domain; for each video resource determined to be hosted on the domain, determining a quality metric for the video resource; generating a quality score from the quality metrics for video resources hosted on the domain; generating a quantity score based on counts of video resources hosted on the domain; determining a domain video score from the quality score and the quantity score; and adjusting, based on the domain video score, one or more video search operations on the video resources hosted on the domain. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Domain video scores can facilitate the prioritization of indexing of video resources. Domain video scores can also improve video search result rankings. Domain video scores can also allow the search system to exclude low-quality video resources from video search result rankings. Domain video scores can also improve the accuracy of video search results from domains that contain spam to artificially manipulate its search ranking or exclude domains that only contain spam. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

1.0 Overview

Servers and server systems host and provide access to resources that are accessible over the Internet. The resources are uniquely identified through URLs, which are associated with a domain name. Some domains include video resources as a subset of the resources hosted on the domain's servers. However, users often do not access resources by directly inputting their URLs. Resources are frequently found by use of a search system, which provides search results that link to resources in response to a search query. The search system scores resources based on their relevance to the search query, their importance relative to other resources, and user feedback signals (e.g., click through rates, etc.), and provides search results that link to the selected resources.

The search system indexes resources to be able to search and provide results quickly. The search system can index resources in a first index, and the indexed resources include videos, images, web pages, and other content. Additionally, a search system can have a separate video index specifically for video resources. The separate index can be a part of the first index. The first index can comprise multiple indices on multiple servers.

As new video content is generated by publishers and hosted on their domains' servers, the search system indexes the new video content to be able to reference the new video content in search results. Any time between the generation of the new video content and the indexing of the new video content is time where the search system cannot perform video-related searches using the video index to identify the video content. While the resource that includes the video resource may be indexed (e.g., a web page that has text and other labels that describe the video resource, and that includes a link to the video resource) and thus may be identified in response to a search of the first index, the video content may not be specifically identified. Furthermore, even after the new video content has been indexed in the video index, there may be no measure from users as to the quality of the new video content.

A domain video score can be used to prioritize the indexing of new video content, and to also score video resources in a search operation. An example domain video score is a score that provides a measure of the quantity and quality of video resources from a domain overall. The domain video score can also provide baseline information as to the quality of new content, for example, before user response is received. As used herein, a "search operation" is any process that is used to facilitate the collection of resources, the indexing of the resources, and/or information retrieval operations to search the resources. Example processes include indexing resources, searching resources, generating scores for ranking resources, and generating search results that identify resources in response to a search of the resources.

1.1 Example Environment

Figure 1:
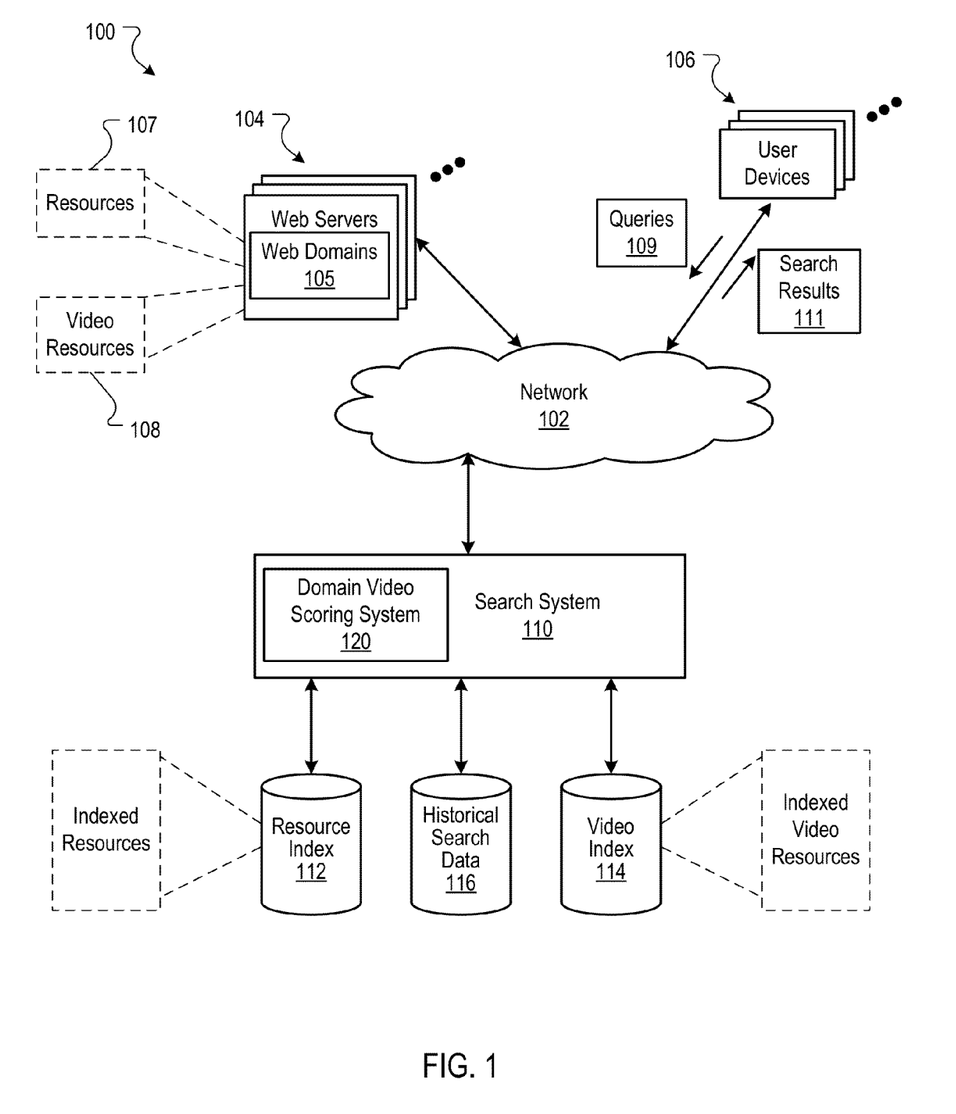
FIG. 1 is a block diagram of an example environment for a domain video scoring system.

FIG. 1 is a block diagram of an example environment 100 for a domain video scoring system 120. The example environment 100 includes a network 102, e.g., a local area network (LAN), wide area network (WAN), the Internet, or a combination of them, that connects servers 104, user devices 106, and the search system 110. The environment 100 may include many thousands of servers 104 and user devices 106.

A server 104 is a computing device or a system of computing devices that hosts resources 107 and is associated with a domain 105. An example domain could be example_videodomain1.com. The domain 105 is owned by a publisher who maintains the server 104 and the resources 107 that are hosted on the server 104.

A resource 107 is any data that can be hosted on a server 104 and provided over the network 102. Each resource is associated with a resource address, such as a URL, often containing the domain name 105. Resources 107 include web pages, documents, images, and video resources 108, to name a few.

An example video resource 108 could be a video clip of a person. The video can be hosted on the server 104 of a domain 105 such as example_videodomain1.com and accessible through a URL such as www.example_videodomain1.com/example.mov. As used herein, a video or resource "on a domain" or "hosted on a domain" is considered to be hosted on a server associated with the domain.

A user device 106 is an electronic device that is under the control of a user and is capable of requesting and receiving resources 107 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 107, the search system 110 identifies the resources 107 by crawling and indexing the resources 107 provided on domains' 105 servers 104. Data about the resources 107 can be indexed based on the resource to which the data corresponds. The indexed and, optionally, cached copies of the resources 107 are stored in a resource index 112. The search system can further identify video resources 108 and index video resources 108 in a video resource index 114.

The user devices 106 submit search queries 109 to the search system 110. In response, the search system 110 accesses the resource index 112 to identify resources 107 that are relevant to the search query 109. The search system 110 identifies the resources 107 and generates search results 111 that identify the resources 107 and returns the search results 111 to the user devices 106.

The search query 109 can also be a search query specific to video resources 108. For example, if the user device 106 submits a search query 109 for a video search operation (e.g., by submitting a query in an input field on a "video search" page of the search system 110), the search system 110 accesses the video index 114 to identify video resources 108 that are relevant to the video search query 109.

The search system 110 can also access both the resource index 112 and the video resource index 114 in response to a search query 109. The search system 110 can thus identify both resources 107 and video resources 108 that are relevant to the search query 109.

The search engine generates search results 111, which are data generated by the search system 110 that identifies resources that are responsive to a particular search query. Each search result includes links to the resources. The identified resource can be a resource 107, such as a web page, or, in the case of video related searches, can be a video resource 108. An example search result 111 can include a web page title, a snippet of text or a portion of an image (or thumbnail of the image) or a portion of a video (or one or more still shots from the video) extracted from the web page, and the URL of the web page.

The search results 111 are ranked based on relevance scores related to the resources identified by the search results 111, such as information retrieval ("IR") scores and quality scores of each resource relative to other resources. The quality scores can be determined from user response to the resource including, for example, a selection rate (e.g., click-through rate) of the resource. For a video search, relevance scores can be based on quality scores as well as information retrieval scores based on labels associated with the videos. Labels are text or data flags that indicate a topic to which the video belongs. Labels can be explicitly associated with a video, for example, by the publisher that is providing the video on the domain 105. For example, a publisher can associate the text "football" with a video that includes content that is directed to football (e.g., highlights from a recent professional football game). The search results 111 are ordered according to the relevance scores and provided to the user device 106 according to the order.

The user devices 106 receive the search results 111, e.g., in the form of one or more web pages with each web page including multiple search results, and render the search results for presentation to users. In response to the user selecting a link in a search result at a user device 106, the user device 106 requests the resource identified by the link. The server 104 hosting the resource receives the request for the resource from the user device 106 and provides the resource to the requesting user device 106.

Data for the search queries 109 submitted during user sessions are stored in a data store, such as a historical search data store 116. For example, the text of search queries can be stored in the historical search data store 116. The historical search data can be anonymized so that the privacy of users is protected. For example, quasi-unique identifiers can be associated with users, but the actual identifying information of the users is not stored in the historical search data. Encryption techniques and obfuscation techniques (e.g., aggregation techniques) can also be used to protect the privacy of users. Selection data specifying actions taken in response to search results provided in response to each search query are also stored in the historical search data store 116. These actions can include whether a search result was selected, and for each selection, for which query the search result was provided, and subsequent actions taken at the user device after the selection. The data stored in the historical search data store 116 can be used to map search queries 109 submitted during search sessions to resources that were identified in search results 111 and the actions taken by users. For example, the historical search data can map how many times each video in the video index 114 was selected and the number of times the videos were presented in the form of a search result. As used herein, a video (or resource) that is referenced in a search result is considered to be "selected" or "clicked" when the search result referencing the video (or resource) is selected by a user.

The historical search data can also store how long a resource is presented to a user. This can be determined by measuring the time between the selection of a resource by a user and when the user returns to the search results 111 or navigates to another resource. For example, if a user clicks on a video resource 108 and returns to the search results 111 two minutes later, this information can be mapped to the video resource 108 in the historical search data store 116. This information can be incorporated into determining a quality score for the resources.

When a publisher generates and publishes new content, such as a new video resource 108 and provides it through a server associated with the domain 105, the new video will not appear in a search result 111 until it is indexed by the search system 110. Further, when the video resource 108 is first indexed, for example, in the video index 114, there may no quality score for the new video based on user interactions.

The system 110 includes a domain video scoring system 120. The domain video scoring system 120 can use the historical search data store 116, the resource index 112, and the video index 114 to determine an overall video score for each domain 105. The search system 110 can then use the domain video score in one or more search operations. For example, for new videos hosted on a server associated with a particular domain name, the search system 110 can assign a default quality score based on the domain video score for the particular domain name.

The domain video score can also or alternatively be used to prioritize the indexing of videos on domains. For example, a domain with a higher domain video score can be indexed in the video index 114 before a video on a domain with a lower domain video score, as the domain with the higher video score is more likely to generate a higher quality and quantity of new video content.

In some implementations, the domain video score comprises a quality score component of the videos on the domain 105 and a quantity score component of the videos on the domain 105. The components are combined to produce the domain video score.

2.0 Domain Video Score

Figure 2:
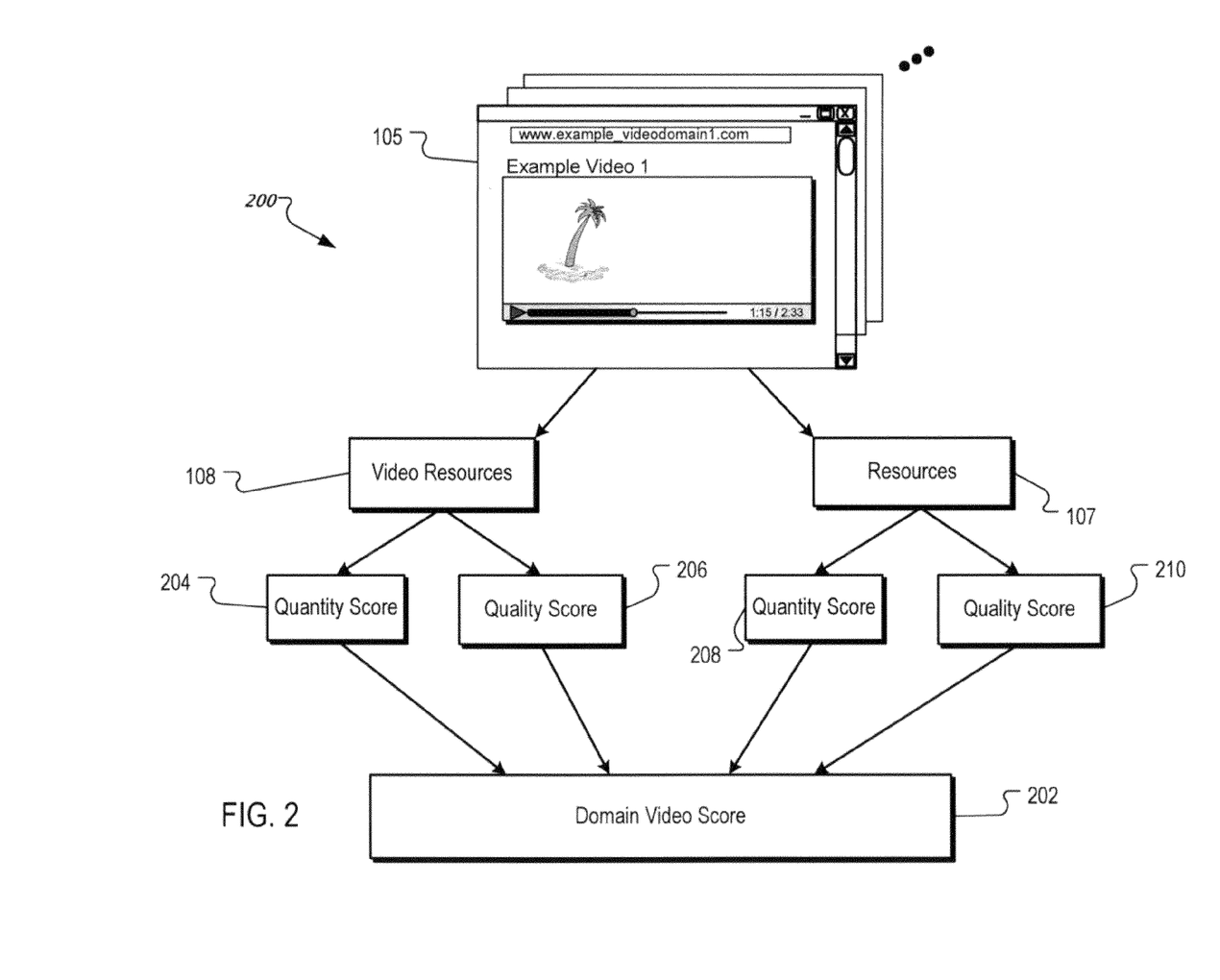
FIG. 2 is a block diagram of data that are used in determining a domain video score.

FIG. 2 is a block diagram of data that are used in determining a domain video score. A domain video score 202 is determined for each domain 105 that provides video resources 108. As described above, there are many uses for a domain video score. For example, any new videos published on the domain can be given the domain video score of the domain as a default quality score. Alternatively, or additionally, the domain video score can be used as a weight or a component of producing quality scores. The domain video score can also be used to weight videos from the domain in ranking videos for a video search result. The domain video score can be used to prioritize the indexing of video resources on domains.

The video resources 108 that are indexed in a video index 114 are videos known to be hosted on the domain 105. The resources known to be video resources 108 can be quantified and qualified to produce a quantity score 204 and a quality score 206.

The remaining resources 107 may or may not include a video resource. Predictive metrics can be used to predict (infer) that a resource 107 includes a video. The inferred video resources can also be quantified and qualified to produce a quantity score 208 and quality score 210.

Figure 3:
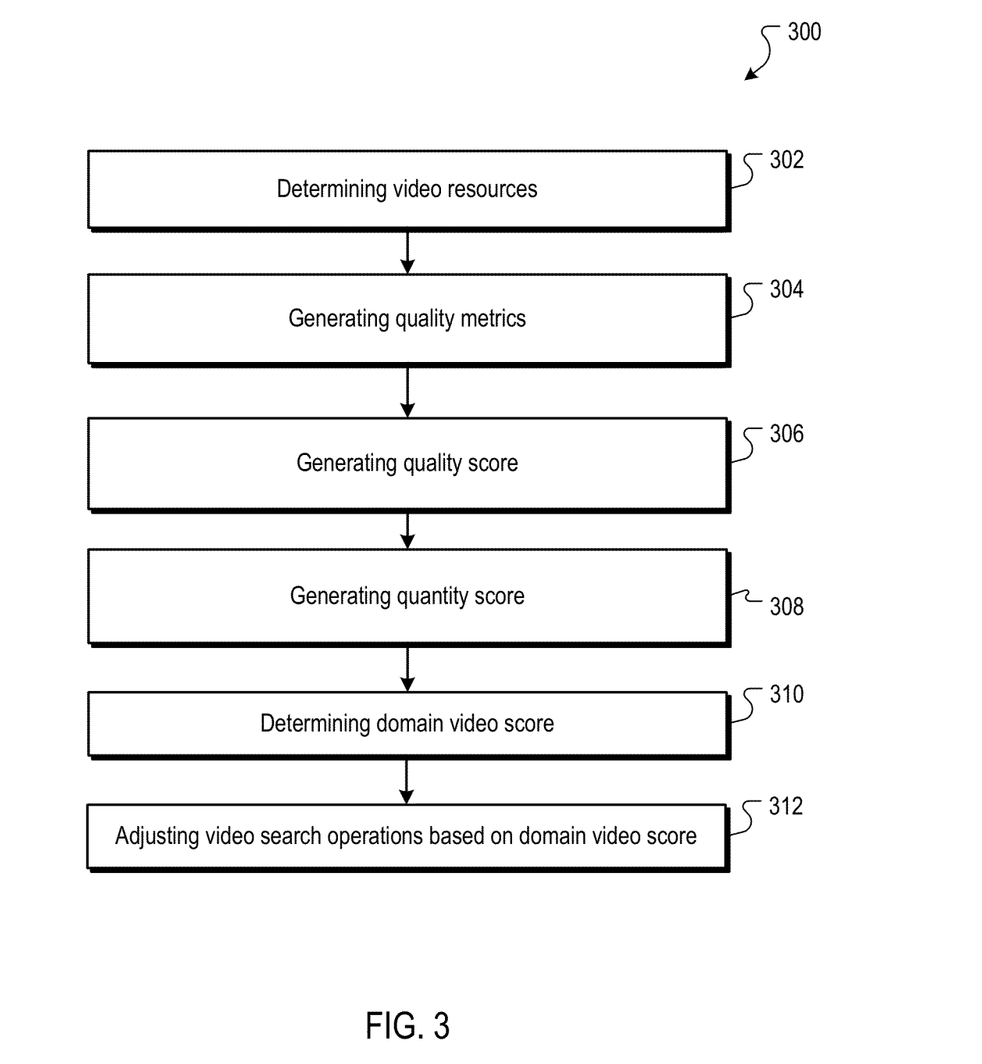
FIG. 3 is a flow chart of an example process for determining a domain video score.

In some implementations, the scores 204, 206, 208 and 210 are combined to produce a domain video score 202. FIG. 3 is a flow chart of an example process 300 for determining a domain video score 202. The example process 300 can be implemented in the domain video scoring system 120 of FIG. 1.

The process 300 determines video resources hosted on a domain (302). Determining video resources hosted on a domain can, for example, include examining a video index accessible to the search system, and also include predicting which resources hosted on the domain include video resources. Resources found in the video index and associated with the domain are known video resources hosted on the domain, while those that are not indexed in the video index but are inferred to include videos are referred to as predicted video resources. The predictive metrics used to predict video resources hosted on the domain is described further in section 3.2.

For each video resource determined (i.e., known or predicted) to be hosted on the domain, the process 300 determines a quality metric for the video resource (304). The quality metric can include a click-through rate for the video resource. In some implementations, the quality metric is a "long-click" rate. A click, or a selection of a resource, is considered a long click if the resource is determined to be presented to the user for longer than a threshold period of time. The presentation time of a resource can be inferred from the time between selection of the resource and the user returning to a search results page that provided the resource or the user navigating to a different resource. Further, if the resource is a video, streaming data can be reported to the search system 110 to provide the amount of time the video was presented. For video resources, the threshold period of time can also be proportional to the overall length of the video, e.g., 10% of the video length, up to a maximum amount of time, e.g., 1 minute.

Using the quality metrics for the video resources hosted on the domain, the process 300 generates a quality score for the domain (306). The quality score can be generated from aggregating the quality metrics for the videos hosted on the domain. The aggregation of the quality metrics to produce the quality score can include separately aggregating quality metrics of indexed video resources and quality metrics of inferred video resources. A more detailed description of the quality score is provided with reference to FIG. 6 in section 4.0.

The process 300 also generates a quantity score based on counts of video resources hosted on the domain (308). The counts of video resources can include a count of the known video resources and a count of the predicted video resources. The quantity score can be a combination of the known video resource count and the predicted video resource count. Additionally, the two counts can be weighted or adjusted before being combined to determine the quantity score.

A more detailed description of the quantity score is provided in sections 3.0, and more detailed description of the quality metric and quality scores are provided in sections 4.0.

The process 300 generates a domain video score from the quality score and the quantity score (310). In some implementations, the domain video score can be a product of the overall quality score and the overall quantity score. In some implementations, the quality score and quantity score can be combined in various ways to produce the domain video score. A more detailed description of the domain video score is provided in section 5.0.

The process 300 uses the domain video score to adjust one or more video search operations on the video resources hosted on the domain (312). For example, the domain video score can be used to prioritize the video indexing of video resources on higher scoring domains. The domain video score can also be used as a component in determining relevance of video resources in ranking search results to a search query returning video resources. Applications of the video score are further described in section 6.0.

3.0 Quantity Score

Figure 4:
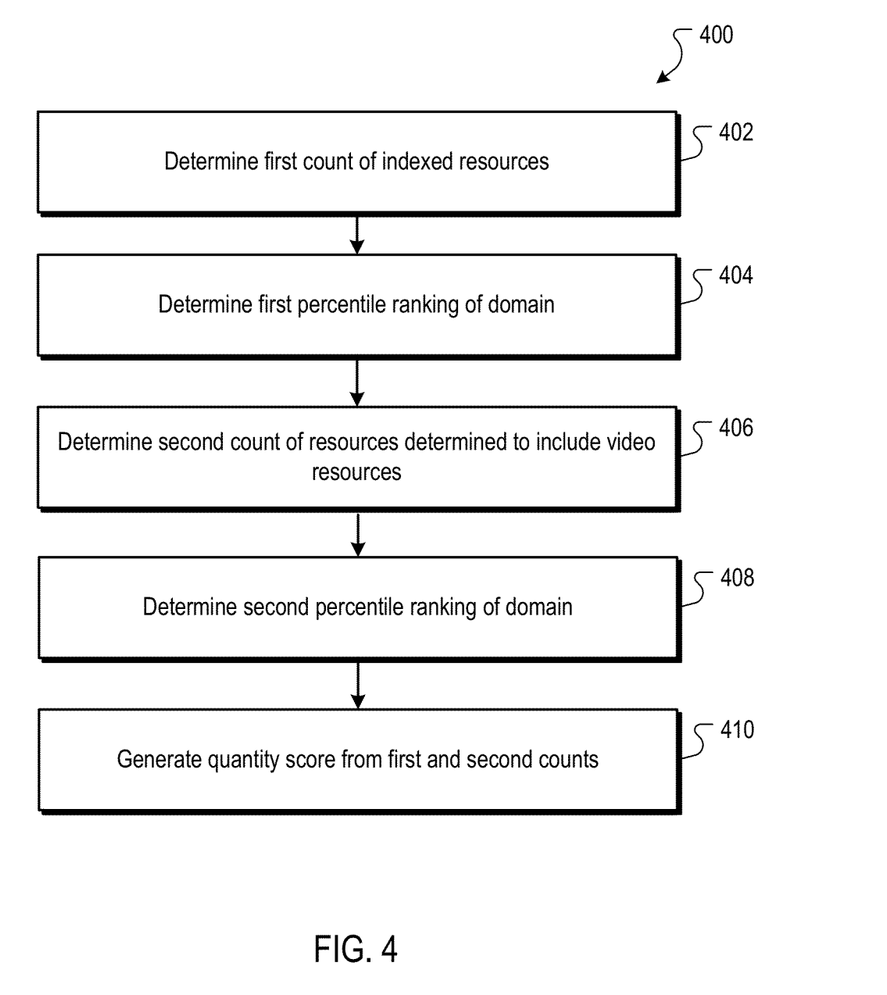
FIG. 4 is a flow chart of an example process for determining a quantity score.

FIG. 4 is a flow chart of an example process 400 for generating a quantity score. The example process 400 can be implemented in the domain video scoring system 120 of FIG. 1. As described above, the quantity score is generated based on counts of video resources on the domain.

The process 400 determines a first count of indexed video resources (402). The video resources indexed in a video index and hosted on the domain are video resources known to be hosted on the domain, and are counted in the first count.

The first count of indexed video resources is used to determine a first percentile ranking of the first count of indexed video resources on the domain relative to other first counts of indexed video resources on other domains (404). For example, the first count of indexed video resources on the domain is compared with the respective first counts of indexed video resources on other domains to determine the first percentile ranking for the domain. Other measurements instead of percentile rankings can also be used. For example, in some implementations, the first count of indexed video resources on the domain is used directly to generate a quantity score or used directly as a component of a quantity score.

In some implementations, the first count is mapped to a first percentile score between 0 and 1. The first percentile score is generated from a cumulative distribution function F(domain first count) mapped to a logarithmic value of the first counts along an x-axis and the number of domains with each corresponding first count on a y-axis. The cumulative distribution function, F(domain first count), is fit to a sigmoid function to generate the first percentile score for the domain.

The process 400 also determines a second count of predicted video resources, which are resources determined to include video resources (406). The resources are determined to include video resources by using predictive metrics. As described above, indexing video resources often requires more time and system resources than indexing resources primarily on textual content. Accordingly, there may be video resources that are not yet indexed in a video index. Thus, in some implementations, the domain video scoring system 120 processes data to predict that a resource includes a video resource. If the prediction is positive, the first resource is counted in a second count to supplement the first count of indexed video resources.

The domain video scoring system 120 can use a variety of metrics to predict whether a resource includes a video. For example, the domain video scoring system 120 can process the URL of the resource to determine whether the URL includes predetermined video keywords, e.g., "video," "play," "watch," ".mov," ".mpg," etc. In some implementations, the domain video scoring system 120 processes the URLs of indexed video resources to identify words and character strings that are found frequently in URLs of known video resources. These words and character strings can be added as keywords to the list of the predetermined video keywords.

Another example predictive metric is a search property ratio for queries. A search property ratio of queries for a resource is the ratio of the number of times the search queries were used for video-specific searches to a number of times the queries were used for non-video-specific searches (e.g., general web searches not specifically directed to image, videos, etc.). The queries that are used in determining the search property ratio for a resource are the queries in the historical search data that resulted in the resource being identified in a search result. For example, a resource can be a web page that has a video of a dancing baby. The domain video scoring system 120 processes the historical search data and determines that many of the queries that resulted in search results identifying the resource were also used for many video search operations, e.g., searches that were specifically directed to the video index 114.

The number of video-specific searches can be compared to the number of non-video-specific searches to produce a number that is the search property ratio. For example, the domain video scoring system 120 may determine that one of the queries is "dancing baby," and the query was entered into a general web search 1 million times, and entered into a specific video search 2 million times. The search property ratio for "dancing baby" is thus 2.0.

Some or all of the queries that produced the resource as a result can be processed in a similar manner to determine search property ratios for each of the queries. The search property ratios for each of the queries can be aggregated or averaged to produce a search property ratio for the resource. If the search property ratio of the resource exceeds a threshold value (e.g., 1.0), the resource is determined to include a video resource.

Another example predictive metric is video keywords in the title of the resource. A resource, such as a web page written in HTML, can have a title, for example, text embedded in <title> tags, which can appear in a title bar of a browser program. The titles of resources can also be examined by the domain video scoring system 120 for predetermined video keywords to be used as a predictive metric. The video keywords searched in the titles can be the same as the video keywords searched in URLs or a different set of video keywords.

These and other predictive metrics can be used to predict video resources on the domain. In some implementations, predictive metrics are weighted separately and then combined to produce an overall predictive metric for the resource that is compared to a threshold value. In some implementations, each predictive metric is considered separately, allowing any one or several in combination to determine that a resource is inferred to include a video.

The second count is used to determine a second percentile ranking of the second count of predicted video resources on the domain relative to second counts of predicted video resources on other domains (408). The second count can be used to determine a second percentile ranking of the domain relative to the respective second counts of other domains. Other measurements instead of percentile rankings can also be used. For example, in some implementations, the second count of predicted video resources on the domain is used directly to generate a quantity score or used directly as a component of a quantity score.

The second percentile ranking can be determined in a manner similar to the first percentile ranking. For example, the second count of video resources on the domain is compared with the respective second counts of video resources on other domains to determine the second percentile ranking for the domain. In some implementations, the second count is mapped to a second percentile score between 0 and 1. The second percentile score is generated from a cumulative distribution function F(domain second count) mapped to a logarithmic value of the second counts along an x-axis and the number of domains with each corresponding second count on a y-axis. The cumulative distribution function, F(domain second count), is fit to a sigmoid function to generate the second percentile score for the domain.

The first percentile ranking and the second percentile ranking can be combined to generate the quantity score (410). In some implementations, the two percentile rankings can be averaged to generate the quantity score. In some implementations, the percentile rankings can be weighted before being combined.

It is possible that the second count of predicted video resources may include an overlap with the first count of indexed video resources. For example, a resource that is a web page that includes a video can be found in both indices. In some implementations, the overlap is filtered out from one of the counts, e.g. from either the first count or the second count, for example, by comparing URLs of video resources in the video index to the URLs of the resources inferred to include video resources in the general index.

In some implementations, the domain video scoring system 120 adjusts the second percentile ranking by a confidence factor before combining the scores to produce a final quantity score. The confidence factor can be a measure of the accuracy of the predictive metrics. To determine the confidence factor, in some implementations the domain video scoring system 120 correlates the first percentile ranking to the second percentile ranking for each domain.

Figure 5:
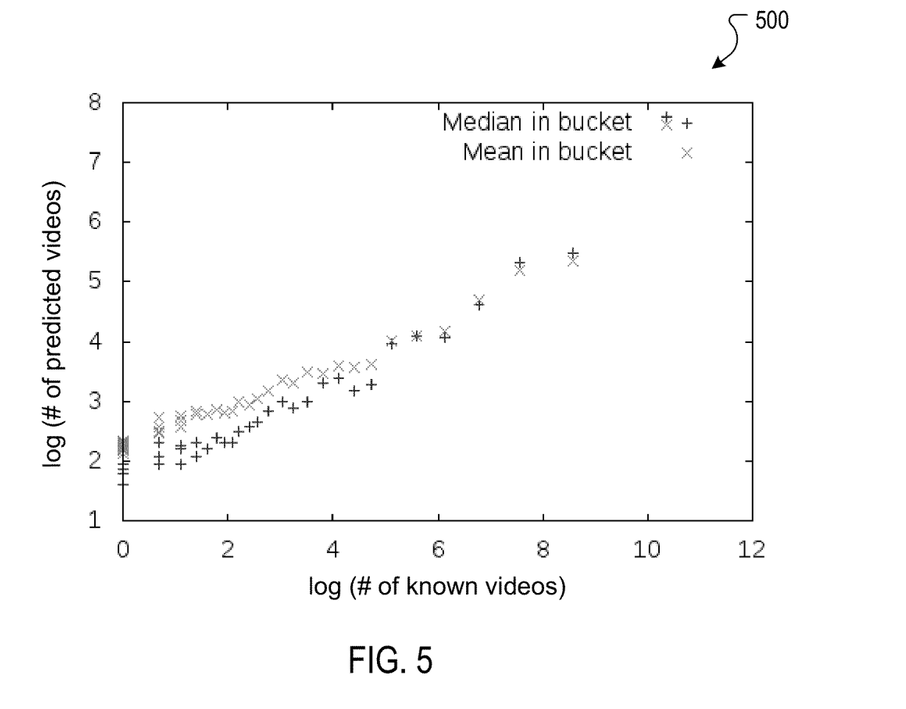
FIG. 5 is a graph of an example correlation of the number of second counts to first counts.

FIG. 5 is a graph 500 of an example correlation of the number of second counts to first counts. Each point represents a bucket of N domains, e.g., 50 domains. The shape of the curve and standard deviation defined by each of the buckets can be used to determine the confidence factor of the predictive metrics and the predicted video resource percentile ranking. The correlation between the first percentile rankings and the second percentile rankings is indicative of the confidence of the predictive metrics, because the number of videos indexed in the video index can be considered to be proportional to the total number of videos on the domain, relative to other domains. Thus, accurate predictive metrics should also produce a second percentile ranking that has a similar proportion as the first percentile ranking if the predictive metrics also reflect a number proportional to the total number of videos on the domain. If the second percentile ranking has a similar proportion as the first percentile ranking, the correlation between the two percentile rankings should be high, and the confidence factor would also be high.

In some implementations, the confidence factor is determined by the function:

$$\alpha = f(\text{Corr}(P_v + P_w))$$

where
α is the confidence factor;
$P_v$ is the first percentile ranking; and
$P_w$ is the second percentile ranking.

The confidence factor is used to adjust the second percentile ranking to produce the overall quantity score according to the formula:

$$P = (P_v + P_w * \alpha)/(1 + \alpha),$$

where P is the final quantity score. The quantity score P can be used with the quality score to generate the domain video score.

The confidence factor can also be used as an indicator for improving the prediction metrics. For example, if a domain or many domains have a high first percentile ranking but a low second percentile ranking, it may indicate that the predictive metrics for the domains can be improved to raise the confidence factor. The predictive metrics can be changed, for example, by expanding the video keyword lists used to search in the URLs and titles of resources. Another example improvement can be an adjusting of the search property ratio threshold.

4.0 Quality Score

Figure 6:
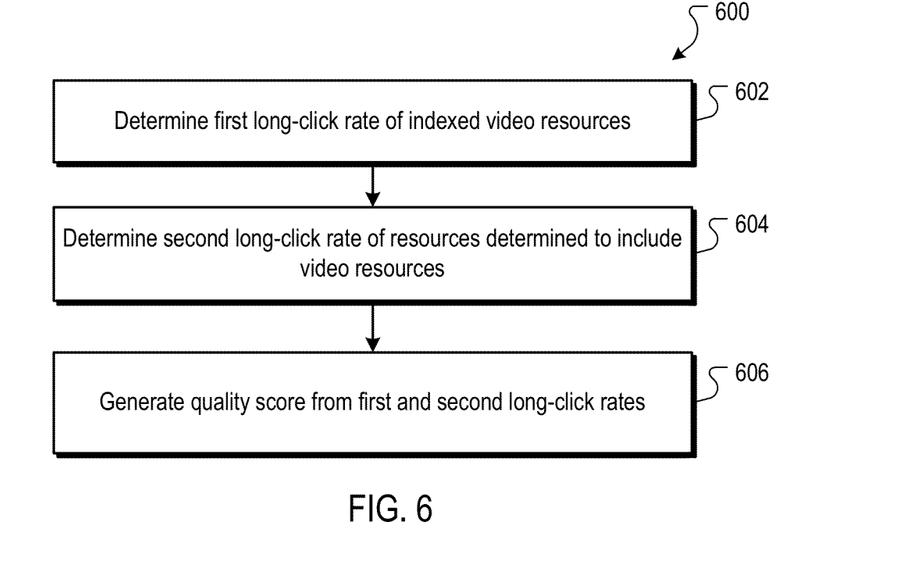
FIG. 6 is a flow chart of an example process for determining a quality score.

FIG. 6 is a flow chart of an example process 600 for determining a quality score. The example process 600 can be implemented in the domain video scoring system 120 of FIG. 1. The quality scores are based on long-click rates determined for the known video resources and the resources predicted to include video resources. Long clicks are a quality indicator based on the premise that users will engage with resources that include information that satisfies their informational needs.

A first long-click rate of indexed video resources is determined (602). For example, the process 600 determines the first long-click rate by determining a ratio of a number of times a video resource was presented beyond a presentation threshold to a total number of times the video resource was presented. For example, the presentation threshold can be a fixed time period, e.g., 1 minute, or a percentage of the overall time of the video, e.g., 10% of the video length. Alternatively, the threshold time can be a combination of the two, such as 1 minute or 50% of the length of the video, whichever is longer. In some implementations, the first long-click rate can instead be based on a ratio of a number of times the video resource was selected and no subsequent selection of another resource was received for a threshold duration to a total number of times the resource was selected.

A second long-click rate for resources is determined (604). For example, the process 600 determines a second long-click rate of the resources hosted on the domain that are determined to include a video resource (and that include resources that are not counted for the first count of video resources). In some implementations, determining the second long-click rate comprises determining a ratio of a number of times the resource was selected and no subsequent selection of another resource was received for a threshold duration to a total number of times the resource was selected.

The process generates a quality score (606). For example, the process 600 combines the long-click rates for indexed video resources and resources determined to include a video. In some implementations, the long-click rates are weighted before the scores are combined by their respective quantity scores according to the formula:

$$Q = (Q_v * P_v + Q_w * P_w)/(P_v + P_w),$$

where
Q is the quality score;
$Q_v$ is the first long-click rate for indexed video resources; and
$Q_w$ is the second long-click rate for resources determined to include a video resource.

In some implementations, the values of $P_v$ and $P_w$ can also be relatively weighted, e.g., by the confidence measure α. The result Q is the quality score for the domain, and can be scaled so that it is a number between 0 and 1.

5.0 Domain Video Score

Referring back to FIG. 2, the domain video score for the domain is the product of the quantity score and the quality score. In some implementations, the domain video score is generated by taking the square root of the product of scores P and Q.

The domain quality score represents an overall quality and quantity of videos hosted on a domain, and can be fitted to a value between 0 and 1, with 1 representing many high quality videos hosted on the domain, and 0 representing few, if any videos hosted on the domain. Thus, if a domain hosts an enormous amount of high-quality videos, the domain score will be close to 1. Conversely, a domain that hosts only a few videos and many non-video resources will have a domain score close to 0.

The domain video score can be used to adjust various search operations relating to video search. For example, the domain video score can be used to prioritize indexing of domains. The resources required to index videos can be better allocated if the search system knows which domains are more likely to provide videos that will be more relevant to users of the search system. Thus, video crawlers can prioritize domains with higher domain video scores when indexing videos for the video index. For example, the domain video scores can be used to rank the domains for indexing, with video resources hosted on higher ranked domains indexed before video resources hosted on lower ranked or unranked domains. Alternatively or additionally, the domain video score can be used in a prioritizing algorithm that weights the indexing of video resources and allocates the resources required for indexing videos accordingly. For example, lower ranked video domains can be indexed after a certain percentage of a higher ranked video domain is indexed.

Another example use of the domain video score is for ranking of video search results. The domain video score can provide a more meaningful default score for video resources that are newly indexed and therefore do not yet have quality scores from user feedback. Also, the domain video score can be used as a weight in ranking videos along with any user feedback quality scores the video might have, relevance scores to the search query, and other factors in generating search results. For example, a search ranking score of a video can be adjusted using the domain video score, or the domain video score can be used as a component in determining the search ranking score. Some videos may not yet have values for certain components of the search ranking score, such as a quality score. In such instances, the domain video score can be given a greater weight or used as a substitute for the missing component scores.

The components of the domain video score can also be used for data processing. For example, a domain with a high overall quality score and a high quantity of predicted video resources but low quantity of known video resources can suggest that the domain has many video resources that have yet to be discovered by the search system. While the low quantity of known video resources might lower the domain video score of the domain, the combination of component scores can signal to the search system that the domain might be worth prioritizing higher in the indexing. Then the system can determine whether the predicted video resources do, in fact, contain video resources, and also better confirm the quality of the videos. This can provide the search system with video resources from a domain that was previously not well known to the system, and thus more effectively provide videos relevant to users of the search system.

6.0 Additional Implementation Details

While the domain video score has been described scoring video resources at a domain level, similar techniques can be applied at finer levels of hosting, such as subdomains, hostnames on domains, specific users on domains, directories, and so forth.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    determining video resources hosted on devices assigned to a domain;
    for each video resource determined to be hosted on the domain, determining a quality metric for the video resource;
    generating a quality score from the quality metrics for video resources hosted on the domain;
    generating a quantity score based a first percentile ranking of the domain, the first percentile ranking being based on a number of video resources that are hosted on the domain relative to respective numbers of video resources hosted on other domains;
    determining a domain video score from the quality score and the quantity score; and
    adjusting, based on the domain video score, one or more video search operations on the video resources hosted on the domain.

2. The method of claim 1, wherein generating the quantity score further comprises generating a second percentile ranking of the domain, the second percentile ranking being based on a number of resources that are determined to include a video resource hosted on the domain relative to respective numbers of resources that are determined to include a video resource hosted on other domains.

3. The method of claim 2, wherein the video resources in the resources that are determined to include a video resource include video resources that are not accounted for when generating the first quantity score.

4. The method of claim 3, wherein determining the second percentile ranking comprises determining that a resource includes a video resource based on the inclusion of a predetermined keyword in a uniform resource locator (URL) of the resource and that is indicative of video content.

5. The method of claim 3, wherein determining the second percentile ranking comprises:

selecting queries from a search log, each selected query being a query that resulted in the presentation of a search result referencing a resource hosted on the domain and a selection of the search result;

determining a search property ratio of the queries that is based on a number of times the search queries were used for video search operations and a number of times the queries were used for non-video search operations; and determining the resource includes a video resource if the search property ratio exceeds a threshold value.

6. The method of claim 3, wherein determining the second percentile ranking comprises:

determining a confidence factor that is a measure of confidence of the second percentile ranking; and adjusting the second percentile ranking by the confidence factor.

7. The method of claim 3, wherein generating the quality score comprises:

determining a first long-click rate of the video resources hosted on the domain and indexed in the video index; and determining a second long-click rate of the resources hosted on the domain that are determined to include a video resource and that include resources that are not counted for the first count of video resources.

8. The method of claim 7, wherein determining the first long-click rate comprises determining a ratio of a number of times a video resource was presented beyond a presentation threshold to a total number of times the video resource was presented; and determining the second long-click rate comprises determining a ratio of a number of times the resource was selected and no subsequent selection of another resource was received for a threshold duration to a total number of times the resource was selected.

9. The method of claim 2, wherein generating the quantity score comprises determining a ratio that is proportional to (i) a first value that is equal to a sum of the first percentile ranking and the second percentile ranking adjusted by the confidence factor divided by (ii) a second value that is proportional to the confidence factor.

10. A system, comprising:

a data processing apparatus; and a computer storage medium encoded with a computer program, the program comprising instructions that when executed by the data processing apparatus cause the data processing apparatus to perform operations comprising:

determining video resources hosted on devices assigned to a domain;

for each video resource determined to be hosted on the domain, determining a quality metric for the video resource;

generating a quality score from the quality metrics for video resources hosted on the domain;

generating a quantity score based a first percentile ranking of the domain, the first percentile ranking being based on a number of video resources that are hosted on the domain relative to respective numbers of video resources hosted on other domains;

determining a domain video score from the quality score and the quantity score; and adjusting, based on the domain video score, one or more video search operations on the video resources hosted on the domain.

11. The system of claim 10, wherein generating the quantity score further comprises generating a second percentile ranking of the domain, the second percentile ranking being based on a number of resources that are determined to include a video resource hosted on the domain relative to respective numbers of resources that are determined to include a video resource hosted on other domains.

12. The system of claim 11, wherein the video resources in the resources that are determined to include a video resource include video resources that are not accounted for when generating the first quantity score.

13. The system of claim 12, wherein determining the second percentile ranking comprises determining that a resource includes a video resource based on the inclusion of a predetermined keyword in a uniform resource locator (URL) of the resource and that is indicative of video content.

14. The system of claim 12, wherein determining the second percentile ranking comprises:

selecting queries from a search log, each selected query being a query that resulted in the presentation of a search result referencing a resource hosted on the domain and a selection of the search result;

determining a search property ratio of the queries that is based on a number of times the search queries were used for video search operations and a number of times the queries were used for non-video search operations; and determining the resource includes a video resource if the search property ratio exceeds a threshold value.

15. The system of claim 12, wherein determining the second percentile ranking comprises:

determining a confidence factor that is a measure of confidence of the second percentile ranking; and adjusting the second percentile ranking by the confidence factor.

16. The system of claim 15, wherein generating the quantity score comprises determining a ratio that is proportional to (i) a first value that is equal to a sum of the first percentile ranking and the second percentile ranking adjusted by the confidence factor divided by (ii) a second value that is proportional to the confidence factor.

17. The system of claim 11, wherein generating the quality score comprises:

determining a first long-click rate of the video resources hosted on the domain and indexed in the video index; and determining a second long-click rate of the resources hosted on the domain that are determined to include a video resource and that include resources that are not counted for the first count of video resources.

18. The system of claim 17, wherein determining the first long-click rate comprises determining a ratio of a number of times a video resource was presented beyond a presentation threshold to a total number of times the video resource was presented; and determining the second long-click rate comprises determining a ratio of a number of times the resource was selected and no subsequent selection of another resource was received for a threshold duration to a total number of times the resource was selected.

19. A computer storage medium encoded with a computer program, the program comprising instructions that when executed by a client device cause the client device to perform operations comprising:

determining video resources hosted on devices assigned to a domain;

for each video resource determined to be hosted on the domain, determining a quality metric for the video resource;

generating a quality score from the quality metrics for video resources hosted on the domain;

generating a quantity score based a first percentile ranking of the domain, the first percentile ranking being based on a number of video resources that are hosted on the domain relative to respective numbers of video resources hosted on other domains;
determining a domain video score from the quality score and the quantity score; and
adjusting, based on the domain video score, one or more video search operations on the video resources hosted on the domain.

20. The computer storage medium of claim 19, wherein generating the quantity score further comprises generating a second percentile ranking of the domain, the second percentile ranking being based on a number of resources that are determined to include a video resource hosted on the domain relative to respective numbers of resources that are determined to include a video resource hosted on other domains.

* * * * *